Aug. 17, 1948.   C. HAMESEDER   2,447,247
ROTARY AIRPLANE MOUNT AND SYNCHRONIZED
WING ADJUSTMENT
Filed Sept. 10, 1945
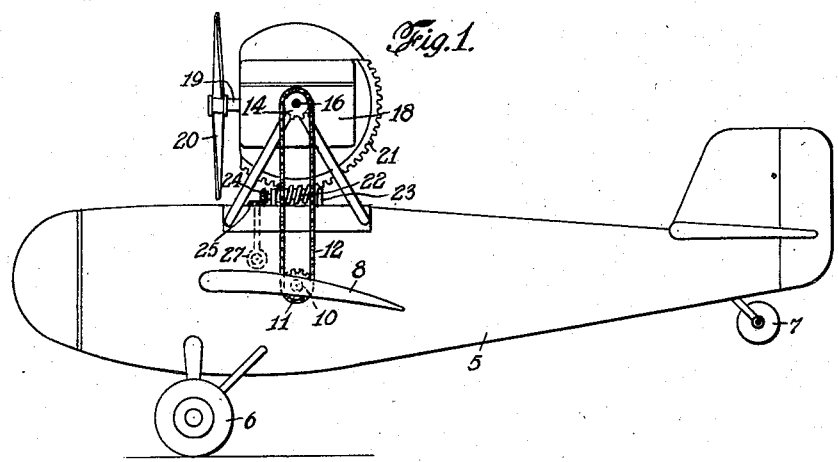
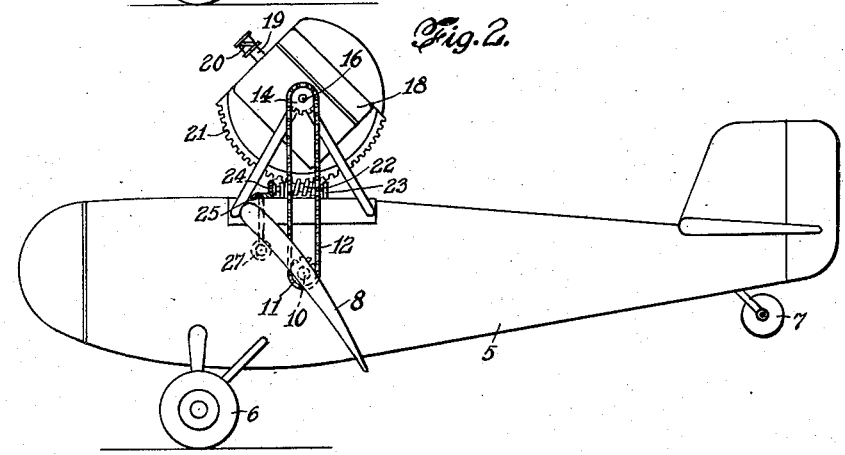
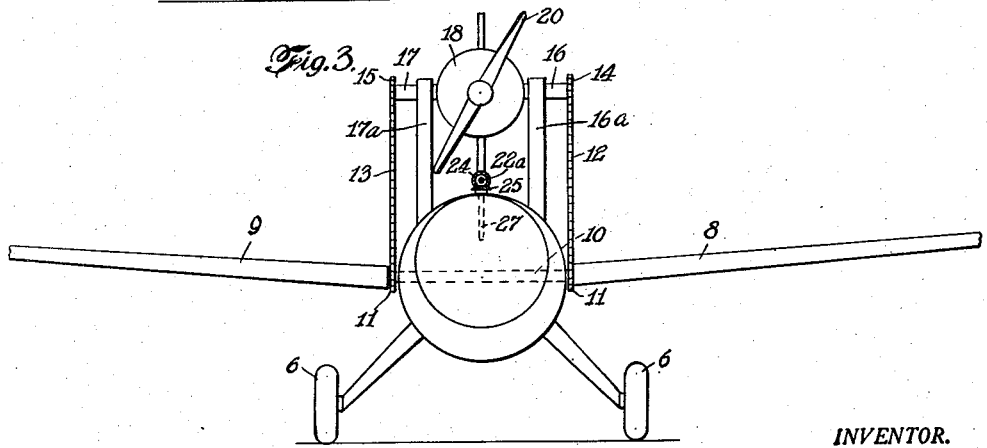
INVENTOR.
CARL HAMESEDER
BY
ATTORNEY.

Patented Aug. 17, 1948

2,447,247

UNITED STATES PATENT OFFICE 2,447,247

ROTARY AIRPLANE MOUNT AND SYNCHRONIZED WING ADJUSTMENT

Carl Hameseder, Stratford, Conn.

Application September 10, 1945, Serial No. 615,475

1 Claim. (Cl. 244—7)

This invention relates to an improved aeroplane construction, and one of its objects is to provide means for mounting the engine so that the propeller can be shifted from its normal position at approximately right angles to the axis of the fuselage to an overhead position, or an intermediate position, to permit of the use of the energy of the engine to assist launching or landing operations, and thereby minimize resistance encountered to both operations by the normal operation of the propeller.

Another object of the invention is the provision of an aeroplane with an engine which is mounted for vertical adjustment on horizontal bearings, and wings which are pivotally supported to vary the angle of pitch, and operated by endless chains which are mounted to turn with the engine, so that the adjustment of the wings to various angles will be synchronized with the adjustment of the engine to move the propeller to various angular relations to the axis of the plane.

With the above and other objects in view, the invention comprises certain new and useful constructions, combinations and arrangements of parts, clearly described in the following specification, and fully illustrated in the accompanying drawings, in which:

Fig. 1 is a side elevation, showing the engine and the wings in their normal positions.

Fig. 2 is a similar view, showing the engine and wings tilted to an angle between the vertical and the horizontal.

Fig. 3 is a front elevation, showing the propeller, engine and wings in normal positions.

Referring to the accompanying drawings which illustrate the practical embodiment of the invention, 5 designates the fuselage or body, which is equipped with the usual forward landing wheels 6, and the tail landing wheel 7.

A supporting wing 8 is mounted on one side of the fuselage or body 5, and a similar wing 9 is mounted on the other side of the fuselage or body, both wings being carried by the heavy cross shaft 10.

Each wing is equipped with a gear 11, located on its shaft end near the side of the fuselage or body 5, and the two gears or sprockets are engaged by the endless chains 12 and 13, which extend upwardly and engage the sprockets 14 and 15 on the ends of the stud shafts 16 and 17, which are rigidly connected with the body 18 of the engine.

The engine is equipped with the usual drive shaft 19, on which the propeller 20 is mounted in the usual manner. The engine body is further equipped with a gear segment 21, which is located midway of the sides of the body, and is engaged by the worm gear 22, which is mounted to turn in bearings 23 secured on top the body or fuselage 5.

The shaft 22a of the worm gear 22 is equipped with a bevel gear 24, which is engaged by the bevel gear 25, on the end of a vertical shaft as shown, which extends into the body or fuselage to engage a manual operating gear 27, arranged therein. The gear 27 operates by means of the horizontal shaft 22a to change the position of the propeller and wings.

The stud shafts 16 and 17 of the engine is supported by the bearing brackets 16a and 17a on the top of the body or fuselage 5. These brackets support the engine so that it can be turned to any angle between its normal approximately horizontal position to an extreme vertical position, and the sweep of the gear segment is sufficient to allow this turning movement.

By adjusting the engine to an angular position, as shown in Fig. 2, the action of the propeller will be to increase the lift, with a corresponding reduction of propulsion force. By adjusting the engine so that the propeller will operate in an approximately horizontal plane, the force of the engine may be applied to diminish the force of the landing movement of the entire plane, so that landing will be rendered safer. In the former case the increased lifting action obtained by the changed position of the propeller will aid in launching the aeroplane.

In the position shown in Fig. 2 the wings are tilted to sharp angles, and thus can act to brake the horizontal movement of the plane in landing.

By mounting the wings for pivotal adjustment, the lift of the wings may be varied to meet special conditions, and by arranging the adjustment of the engine in synchronism with the adjustment of the wings, the lifting action of the propeller may be adapted to the condition established by the adjustment of the wings.

It is obvious that by changing the ratio which governs the action of the gears on the endless chains, the degree of tilting of the wings may be increased or decreased, with reference to the tilting of the engine.

It is understood that various changes may be made in the details of construction, their combination and arrangement, within the scope of the claim hereof, which defines the invention.

Having described my invention, I claim as new:

In an aeroplane comprising a body, a relatively strong transverse shaft rotatably extending through said body and having main suspension wings fixed thereon, sprocket gears on said shaft located closely between the wings and the lateral sides of said body, a pair of bearing brackets rising relatively high from said body on the transverse line of said shaft, the brackets being inwardly of said sides, a motor with propeller, aligned stub shafts passing revolvably through said brackets and being fast with the motor between said struts, the propeller blades being clear of and above said body, sprocket gears on said stub shafts registering with and above the first mentioned gears, sprocket chains operatively connecting the registering gears, a relatively large centrally disposed gear segment fast with the motor and partly extending therebelow, aligned bearings fast with the motor and partly extending therebelow, aligned bearing fast with said body below said segment, a worm gear having a shaft journalled in said bearings and being meshed with the teeth of said gear segment, a bevel gear fast on the worm shaft, another bevel gear meshing with the first bevel gear, a rod rigid with the second mentioned bevel gear and having an end within said body, and manual control means disposed on said rod end, substantially as and for the purpose described.

CARL HAMESEDER.

REFERENCES CITED

The following references are of record in the file of this patent:

UNITED STATES PATENTS

| Number | Name | Date |
| --- | --- | --- |
| 1,732,141 | Peterson | Oct. 15, 1929 |
| 1,795,035 | Pellissier | Mar. 3, 1931 |
| 1,865,744 | Cornelius | July 5, 1932 |
| 1,867,963 | Blahnik | July 10, 1932 |
| 2,007,319 | Wurth | July 9, 1935 |
| 2,119,369 | Twining | May 31, 1938 |
| 1,857,849 | Hojinowski | May 10, 1943 |
| 2,382,824 | Solomon | Aug. 14, 1945 |

FOREIGN PATENTS

| Number | Country | Date |
| --- | --- | --- |
| 551,186 | France | Jan. 2, 1923 |